United States Patent
Zeng et al.

(10) Patent No.: US 12,306,011 B2
(45) Date of Patent: May 20, 2025

(54) ROAD INFORMATION CORRECTION METHOD, APPARATUS, AND SYSTEM BASED ON VEHICLE-TO-EVERYTHING

(71) Applicant: Catarc Automotive Test Center (Guangzhou) Co., Ltd., Guangdong (CN)

(72) Inventors: Liqiang Zeng, Guangdong (CN); Xu Wang, Guangdong (CN); Ziwen Zhang, Guangdong (CN); Jianhua Zhou, Guangdong (CN); Zhuo Hu, Guangdong (CN); Su Zhou, Guangdong (CN)

(73) Assignee: Catarc Automotive Test Center (Guangzhou) Co., Ltd., Guangzhou (CN)

( * ) Notice: Subject to any disclaimer, the term of this patent is extended or adjusted under 35 U.S.C. 154(b) by 230 days.

(21) Appl. No.: 18/058,313

(22) Filed: Nov. 23, 2022

(65) Prior Publication Data

US 2023/0384119 A1    Nov. 30, 2023

(30) Foreign Application Priority Data

May 25, 2022   (CN) .......................... 202210574027.6

(51) Int. Cl.
*G01C 21/00* (2006.01)
*B60G 17/016* (2006.01)
(Continued)

(52) U.S. Cl.
CPC ....... *G01C 21/3841* (2020.08); *B60G 17/016* (2013.01); *B60W 60/001* (2020.02);
(Continued)

(58) Field of Classification Search
CPC ............ G01C 21/3841; G01C 21/3859; G01C 21/3893; G01C 21/3822; G01C 21/3848;
(Continued)

(56) References Cited

U.S. PATENT DOCUMENTS

2020/0263992 A1 *   8/2020   Gaal ................... G01C 21/3878
2021/0004363 A1 *   1/2021   Bailly ..................... G06T 17/05
(Continued)

FOREIGN PATENT DOCUMENTS

CN          111797103 A  *  10/2020

OTHER PUBLICATIONS

Machine Translation of CN111797103A (Year: 2020).*

*Primary Examiner* — Sahar Motazedi

(57) ABSTRACT

The present disclosure provides a road information correction method, apparatus, and system based on vehicle-to-everything (V2X). The method includes: sending a road information map to a first vehicle, such that the first vehicle obtains first original road information by using the road information map, and collects real-time road information; receiving the real-time road information uploaded by the first vehicle; determining, according to the real-time road information, whether the stored first original road information needs to be corrected; and if yes, correcting the stored first original road information according to the real-time road information; otherwise, not correcting the stored first original road information. According to the embodiments of the present disclosure, road information stored in a cloud can be corrected in a timely manner, and fast-changing information and slow-changing information can be identified to provide different determining mechanisms for the two, thereby ensuring precision of correcting road information.

4 Claims, 5 Drawing Sheets

(51) Int. Cl.
*B60W 60/00* (2020.01)
*G08G 1/0967* (2006.01)
*H04W 4/40* (2018.01)

(52) U.S. Cl.
CPC ..... *G01C 21/3859* (2020.08); *G01C 21/3893* (2020.08); *G08G 1/096775* (2013.01); *H04W 4/40* (2018.02); *B60G 2400/82* (2013.01); *B60W 2556/45* (2020.02)

(58) Field of Classification Search
CPC ............. B60G 17/016; B60G 2400/82; B60W 60/001; B60W 2556/45; G08G 1/096775; G08G 1/0133; G08G 1/0112; G08G 1/0141; G08G 1/096716; G08G 1/096741; G08G 1/0129; G08G 1/096791; H04W 4/40
See application file for complete search history.

(56) References Cited

U.S. PATENT DOCUMENTS

2021/0025725 A1* 1/2021 Braunstein ............. G01C 21/30
2021/0180959 A1* 6/2021 Muto .................... G08G 1/0112
2022/0155098 A1* 5/2022 Liu ........................ G01C 21/32

* cited by examiner

ROAD INFORMATION CORRECTION METHOD, APPARATUS, AND SYSTEM BASED ON VEHICLE-TO-EVERYTHING

CROSS REFERENCE TO RELATED APPLICATIONS

The present application claims the benefit of Chinese Patent Application No. 202210574027.6 filed on May 25, 2022, the contents of which are incorporated herein by reference in their entirety.

TECHNICAL FIELD

The present disclosure relates to the field of vehicle-to-everything (V2X) information processing, and in particular, to a road information correction method, apparatus, and system based on V2X.

BACKGROUND

With the development of communications technologies, the V2X technology is gradually applied to perception and transmission of road information. The road information is comprehensive information that includes a road edge information, a lane information, road roughness information, a road surface friction coefficient, road traffic information, and vehicle driving information. Currently, road information of a high-precision map is mainly collected by a perception device of a vehicle, and the collected road information is uploaded to a cloud by using a wireless network. The road information is corrected mainly by recollecting road information by using a professional collection vehicle, or updating a traffic condition through superposition of road information that is different from an original map with the original map. And high-precision map data downloaded from the cloud is corrected by collecting real-time road information by a single vehicle.

However, if the road information is collected only by using the professional collection vehicle having a laser radar, an active suspension, and a front-view camera, costs of the road information collection are high, and a road needs to be re-identified and calculated when each vehicle passes a specified road section or the road is under construction, subsidence, or damage. In addition, a negative feedback cannot be implemented in a collection process of the road information, that is, road information data cannot be corrected according to an actual road condition encountered by a vehicle, resulting in the large amount of calculation for road information collection data and making it difficult to improve collection precision.

SUMMARY

The present disclosure provides a road information correction method, apparatus, and system based on V2X, to resolve a technical problem that road information is not corrected in a timely manner and precision is low.

To resolve the foregoing technical problem, according to a first aspect, the embodiments of the present disclosure provide a road information correction method based on V2X, including:
sending a road information map to a first vehicle, such that the first vehicle obtains first original road information by using the road information map, and collects real-time road information, where the road information map is generated by a cloud server according to stored first original road information;
receiving the real-time road information uploaded by the first vehicle;
determining, according to the real-time road information, whether the stored first original road information needs to be corrected; and
if yes, correcting the stored first original road information according to the real-time road information;
otherwise, not correcting the stored first original road information.

The real-time road information uploaded by the first vehicle is received, such that the real-time road information can be collected in a timely manner when a road condition in a road section changes, and the stored first original road information is corrected according to the real-time road information, thereby ensuring timeliness of data update. In this way, a problem that road information on a cloud cannot be quickly updated because road information is periodically collected by a map collection vehicle is avoided.

The stored first original road information is obtained by receiving first original road information collected by a second vehicle.

After the receiving first original road information collected by a second vehicle, the method includes:
receiving second original road information collected by the second vehicle;
calculating a deviation between the second original road information and the stored first original road information;
determining whether the deviation is greater than a first deviation threshold; and
if yes, correcting the stored first original road information by replacing the stored first original road information with the second original road information;
otherwise, not correcting the stored first original road information.

After the road information map is generated, the second vehicle continues to periodically collect road information of the road section covered by the map. When it is found that the second original road information deviates from the stored first original road information, abnormal data is filtered out by using the preset first deviation threshold, to ensure precision of the first original road information.

After the first vehicle obtains the first original road information by using the road information map, the method includes:
applying, by the first vehicle, the first original road information, specifically including: controlling an active suspension system of a vehicle in advance according to original road information of road ahead, assisting a self-driving vehicle to plan a vehicle trajectory in advance according to the original road information of the road ahead, giving a driver a safety prompt in advance according to the original road information of the road ahead, or reporting a dangerous situation on a road to a road management department according to the original road information of the road ahead.

The first vehicle may apply the first original road information, and obtain first original road information of the front road section in advance, thereby reducing the amount of perception calculation of current road information and providing more sufficient reserved time for vehicle control and decision making.

The determining, according to the real-time road information, whether the stored first original road information needs to be corrected is specifically:

setting the number m of vehicles that continuously upload the real-time road information;

calculating a difference between the real-time road information of a type continuously uploaded by each of the m vehicles in a road section and the stored first original road information of the type;

determining whether the differences are greater than a preset second deviation threshold; and if yes, determining that the real-time road information is fast-changing information, and determining, according to a first determining rule, whether the stored first original road information needs to be corrected;

otherwise, determining that the real-time road information is slow-changing information, and determining, according to a second determining rule, whether the stored first original road information needs to be corrected, where a type of the real-time road information includes one or a combination of a road edge information, a lane edge information, a road obstacle information, road roughness information, road visibility information, a road altitude information, road global positioning system (GPS) coordinate information, and a road surface friction coefficient.

The determining, according to a first determining rule, whether the stored first original road information needs to be corrected includes:

calculating a standard deviation of the real-time road information of the type uploaded by the m vehicles in the road section;

determining whether the standard deviation is less than a preset standard deviation threshold; and if yes, determining that the stored first original road information needs to be corrected;

otherwise, determining that the stored first original road information does not need to be corrected.

The determining, according to a second determining rule, whether the stored first original road information needs to be corrected includes:

responsive to a time for receiving the real-time road information in the road section reaches a preset time period threshold, or responsive to a data volume of the real-time road information reaches a preset data volume threshold, calculating a deviation between the real-time road information of the type and the original road information;

determining whether the deviation is greater than a preset third deviation threshold; and if yes, determining that the stored first original road information needs to be corrected;

otherwise, determining that the stored first original road information does not need to be corrected.

The fast-changing information and the slow-changing information are distinguished, such that a road change situation can be more accurately identified, and a corresponding determining mechanism is used for different real-time road information. The fast-changing information can be identified in a timely manner, and the standard deviation and the standard deviation threshold are calculated, such that no abnormal data due to a sensor error is used to correct the first original road information. The slow-changing information can be stored to a sufficient data volume according to the preset time period threshold and the second data volume threshold, thereby reducing overall impact on the data due to a collection error.

The correcting the stored original road information according to the real-time road information is replacing the stored first original road information with the real-time road information.

According to a second aspect, the embodiments of the present disclosure provide a road information correction apparatus based on V2X, including:

a first sending unit, configured to send a road information map to a first vehicle, such that the first vehicle obtains original road information by using the road information map, and collects real-time road information, where the road information map is generated by a cloud server according to stored first original road information;

a first receiving unit, configured to receive the real-time road information uploaded by the first vehicle;

a first judging unit, configured to determine, according to the real-time road information, whether the stored first original road information needs to be corrected; and a first correction unit, configured to: responsive to the first judging unit determines that correction is required, correct the stored first original road information according to the real-time road information; and responsive to the first judging unit determines that no correction is required, not correct the stored first original road information.

According to a third aspect, the embodiments of the present disclosure provide a road information correction system based on V2X, including a cloud server, a first vehicle, and a second vehicle, where the road information correction apparatus based on V2X in the embodiments of the present disclosure is provided on the cloud server;

the first vehicle is configured to receive a road information map sent by the cloud server;

obtain first original road information by using the road information map, and apply the first original road information; and during driving in a road section covered by the road information map, collect real-time road information of the corresponding road section and send the real-time road information to the cloud server, such that the cloud server corrects the stored first original road information according to the real-time road information; and the second vehicle is configured to collect first original road information and send the first original road information to the cloud server, such that the cloud server generates the road information map according to the first original road information; and collect second original road information, such that the cloud server corrects the stored first original road information according to the second original road information.

According to the road information correction system in the embodiments of the present disclosure, the real-time road information uploaded by the first vehicle is received, such that the real-time road information can be collected in a timely manner when a road condition in a road section changes, and the stored first original road information is corrected according to the real-time road information, thereby ensuring timeliness of data update. In this way, a problem that road information on a cloud cannot be quickly updated because road information is periodically collected by a map collection vehicle is avoided.

DETAILED DESCRIPTION

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
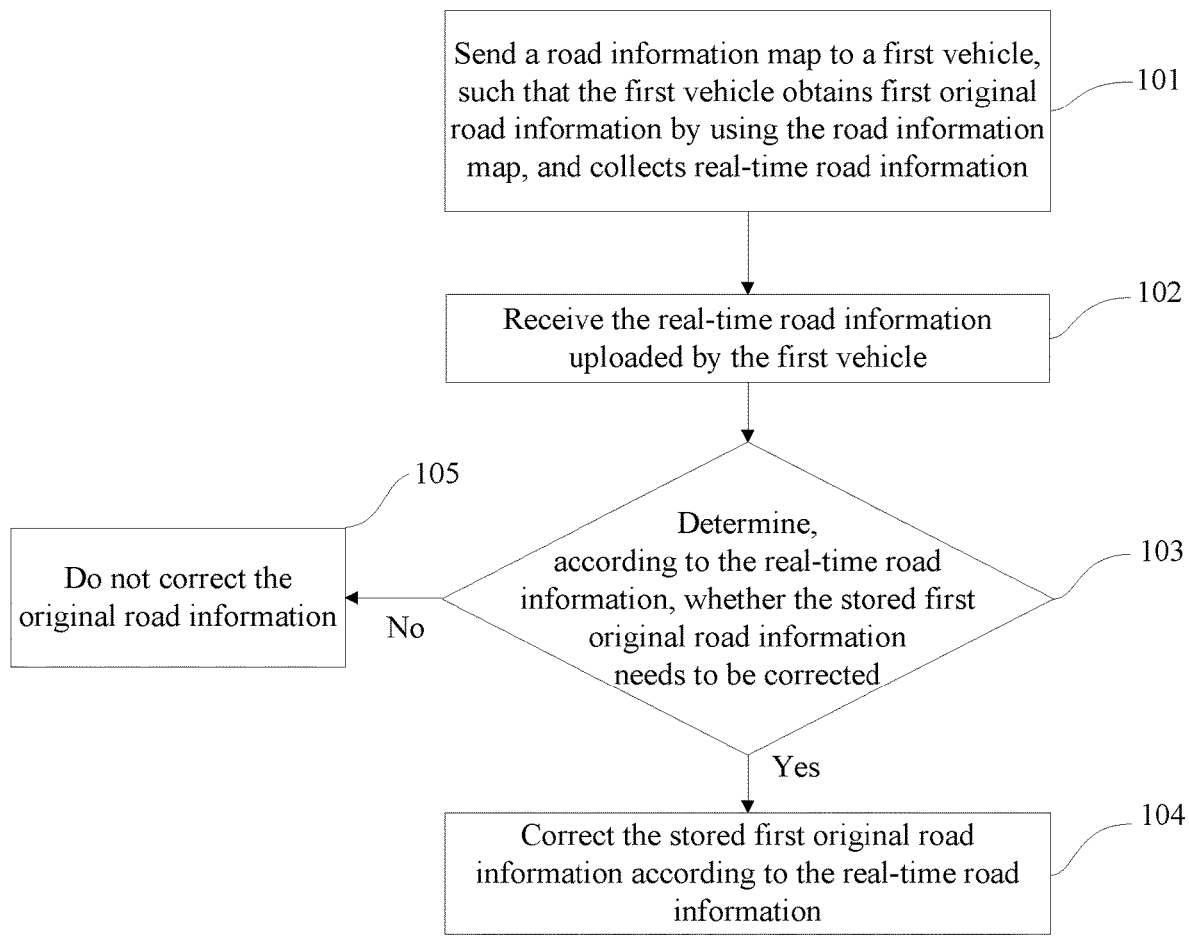
FIG. 1 is a schematic flowchart of an embodiment of a road information correction method based on V2X according to the present disclosure.

Referring to FIG. 1, FIG. 1 is a schematic flowchart of an embodiment of a road information correction method based on V2X according to the present disclosure. The method mainly includes steps 101 to 105. Details are as follows:

Step 101: Send a road information map to a first vehicle, such that the first vehicle obtains first original road information by using the road information map, and collects real-time road information, where the road information map is generated by a cloud server according to stored first original road information.

In this embodiment, the road information map includes first original road information of a covered road section, where the first original road information includes: a road edge information, a road obstacle information, a road altitude information, road GPS coordinate information, road visibility information, a lane information, road roughness information, and a road surface friction coefficient. The first vehicle has a perception device, a positioning system, and a wireless data transmission capability. The perception device includes a camera, a laser radar, a six-component force sensor, a body acceleration sensor, a shaft head acceleration sensor, a suspension displacement sensor, a centroid acceleration sensor, and an active suspension device. The positioning system includes GPS, an inertial measurement unit (IMU), visual assistance, a steering wheel angle sensor, a wheel speed sensor, and a radar. The wireless data transmission capability includes a cellular network, an LTE-V communications network, and dedicated short range communications (DSRC).

In this embodiment, after the first vehicle obtains the first original road information by using the road information map, the method further includes: applying, by the first vehicle, the first original road information, specifically including: controlling an active suspension system of a vehicle in advance according to original road information of road ahead, for example, the vehicle obtains the first original road information of the road ahead to reduce a calculation requirement of real-time perception of undulation of the road ahead by the vehicle and control the active suspension system of the vehicle in advance more effectively, including parameters such as a real-time position, stiffness, height, stroke, and damping of the suspension; assisting a self-driving vehicle to plan a vehicle trajectory in advance according to the original road information of the road ahead, for example, the vehicle obtains road information of the road ahead such as a pothole, a bump, and an obstacle ahead in advance to assist the self-driving vehicle to plan the vehicle trajectory more accurately in advance; giving a driver a safety prompt in advance according to the original road information of the road ahead, for example, when there is a condition such as an abnormal pothole or obstacle on the road ahead, the vehicle broadcasts warning information to the driver in advance to remind the driver to slow down and pay attention to the road condition; or reporting a dangerous situation on a road to a road management department according to the original road information of the road ahead, for example, passing vehicles constantly monitor and feed back the road condition to help the road management department to continuously monitor the road, and when there is a dangerous condition such as subsidence, damage, or displacement occurs on the road, the road management department can obtain the road condition in the first time, so as to carry out road maintenance work in a timely manner and improve safety of the road.

In this embodiment, a request sent by the first vehicle for obtaining the road information map of the front road section is received through wireless data transmission, and the road information map is sent to the first vehicle. After obtaining the road information map, the first vehicle decodes the road information map to obtain required the first original road information of the front road section, so as to help the vehicle obtain more time for trajectory planning and system execution, thereby reducing dependence on real-time perception and a real-time data calculation amount, and reducing costs of a sensor and a calculation system. While using the road information map, the first vehicle collects the real-time road information of the road section. A collection manner includes but is not limited to: performing collection by using a vision sensor, a radar sensor, and an active suspension system of the vehicle, where the active suspension system has the following functions: the system can perceive a real-time position of each wheel suspension by controlling a position sensor of a motor, the system can perceive real-time posture information and acceleration information of the vehicle through an IMU of the vehicle, and the vehicle positioning system calculates the road roughness by fusing real-time travel information of the suspension, posture information of the vehicle, body acceleration information, and high precision positioning information of the vehicle. The real-time road information includes one or a combination of a road edge information, a road obstacle information, a road altitude information, road GPS coordinate information, road visibility information, a lane information, road roughness information, and a road surface friction coefficient.

Step 102: Receive the real-time road information uploaded by the first vehicle.

In this embodiment, the real-time road information collected by the first vehicle is received through wireless data transmission.

Step 103: Determine, according to the real-time road information, whether the stored first original road information needs to be corrected. If yes, perform step 104; otherwise, perform step 105.

In this embodiment, road information changes due to wear, subsidence, natural cracking, construction, a natural disaster, and a traffic accident on a road. The received real-time road information is compared with the stored first original road information to determine whether the real-time road information is significantly different from the stored first original road information and whether the stored first original road information needs to be corrected.

Step 104: Correct the stored first original road information according to the real-time road information.

In this embodiment, the correcting the stored original road information according to the real-time road information is replacing the stored original road information with the real-time road information. When the road roughness changes and the stored first original road information needs to be corrected, the first vehicle performs a curve fitting operation on real-time travel information of the suspension, posture information of the vehicle, body acceleration information, and high-precision positioning information of vehicle in a same manner as the original road information, to obtain a new road roughness road spectrum, and replaces the road roughness road spectrum in the first original road information with a new road roughness road spectrum. For a change in the road obstacle, the road altitude, and the road GPS coordinate information, new road information is obtained through superposition correction, to replace the stored first original road information.

Step 105: Do not correct the original road information.

In this embodiment, through a negative feedback mechanism for constant correction on received real-time road information, a first vehicle continuously re-collects real-time road information by using a road information map, to correct stored first original road information, so as to ensure that the first original road information is always updated in synchronization with an actual road situation. After more and more vehicles collect real-time road information at different locations of a road, precision of the first original road information is continuously updated and iteratively.

Figure 2:
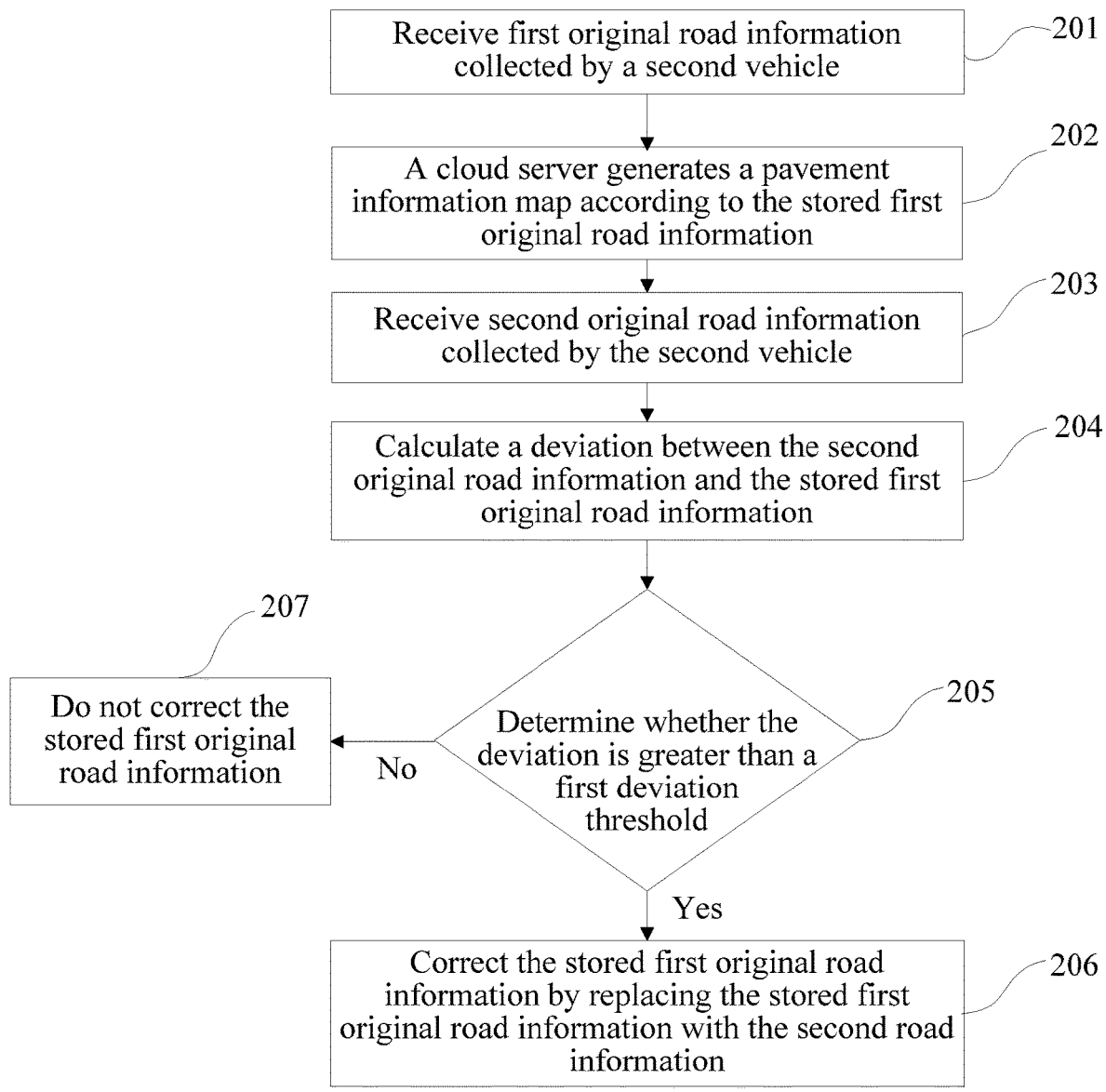
FIG. 2 is a schematic flowchart of another embodiment of a road information correction method based on V2X according to the present disclosure.

Referring to FIG. 2, FIG. 2 is a schematic flowchart of another embodiment of a road information correction method based on V2X according to the present disclosure. The method mainly includes steps 201 to 207. Details are as follows:

Step 201: Receive first original road information collected by a second vehicle.

In this embodiment, the stored first original road information is obtained by receiving the first original road information collected by the second vehicle. The second vehicle is a map collection vehicle, and has a perception device, a positioning system, and a wireless data transmission capability. The perception device includes a camera, a laser radar, a six-component force sensor, a body acceleration sensor, a shaft head acceleration sensor, a suspension displacement sensor, a centroid acceleration sensor, and an active suspension device. The positioning system includes GPS, IMU, visual assistance, a steering wheel angle sensor, a wheel speed sensor, and a radar. The wireless data transmission capability includes a cellular network, an LTE-V communications network, and DSRC. The second vehicle may be a high-precision map collection vehicle having a high-precision radar and a front-view camera, or may be a home vehicle having one or a combination of the foregoing perception devices.

Step 202: A cloud server generates a road information map according to the stored first original road information.

In this embodiment, responsive to a data volume of the stored first original road information reaches a preset original road information data volume threshold, the cloud server fuses the first original road information to generate the road information map, and the preset original road information data volume threshold may be set according to features such as an information volume, vehicle traffic, and an external environment factor of the road section. The second vehicle includes a home vehicle in addition to the high-precision map collection vehicle. Therefore, after deviation information caused by a sensor error is filtered out by using the preset original road information data volume threshold, sufficient first original road information is available to ensure precision of the generated road information map.

Step 203: Receive second original road information collected by the second vehicle.

In this embodiment, after generating the road information map on the cloud server, the map collection vehicle continues to periodically collect second original road information of each road section, where information that needs to be collected for the second original road information and the first original road information is the same.

Step 204: Calculate a deviation between the second original road information and the stored first original road information.

In this embodiment, the deviation calculation is specifically: performing statistical analysis on the collected second original road information; filtering out abnormal data; obtaining an average value by averaging remaining data; and calculating a difference between the average value and original data, where the difference is the deviation.

Step 205: Determine whether the deviation is greater than a preset first deviation threshold, where the first deviation is a road parameter change caused by factors such as road subsidence, geological slow movement, and road aging, information data should be slowly accumulated, and a data change trend is a monotone change, and the first deviation threshold includes: (1) a deviation of basic information data such as a width, a curvature, and a gradient of the road exceeds a specified threshold, where the specified threshold is set according to a specific requirement; and/or (2) health data such as a subsidence height, a fluctuation condition, and a crack width of the road exceeds a specified threshold, where the specified threshold is set according to a specific requirement. If yes, perform step 206; otherwise, perform step 207.

Step 206: Correct the stored first original road information by replacing the stored first original road information with the second original road information.

Step 207: Do not correct the stored first original road information.

Figure 3:
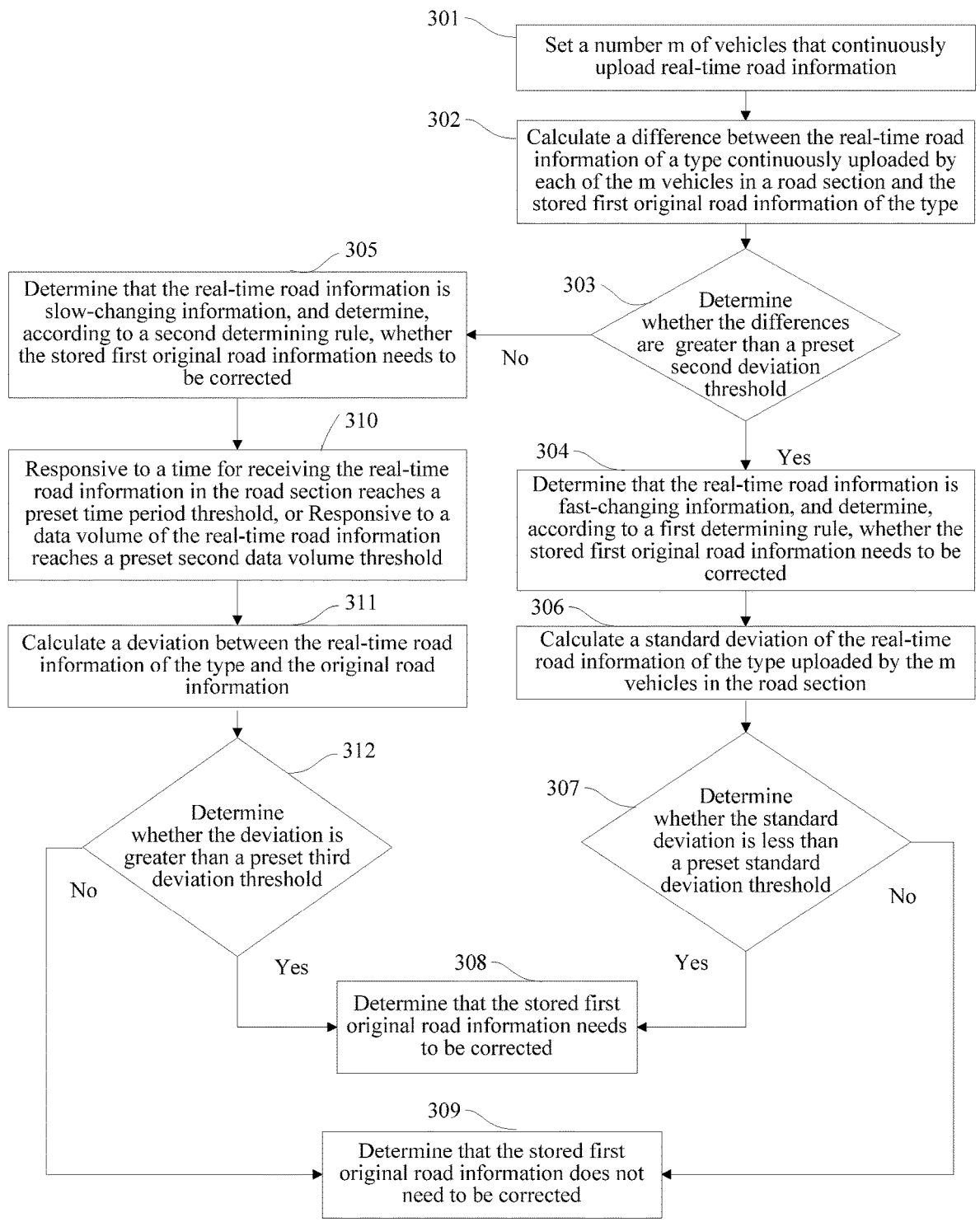
FIG. 3 is a schematic flowchart of still another embodiment of a road information correction method based on V2X according to the present disclosure.

Referring to FIG. 3, FIG. 3 is a schematic flowchart of still another embodiment of a road information correction method based on V2X according to the present disclosure. The method mainly includes steps 301 to 312. Details are as follows:

In this embodiment, steps 301 to 312 are a specific implementation process of step 103.

Step 301: Set the number m of vehicles that continuously upload the real-time road information.

Step 302: Calculate a difference between the real-time road information of a type continuously uploaded by each of the m vehicles in a road section and the stored first original road information of the type.

In this embodiment, the difference is a difference between an average value and original data, where the average value is obtained after statistical analysis is performed on the first original road information, data whose deviation is abnormal is filtered out, and remaining data is averaged.

Step 303: Determine whether the differences are greater than a preset second deviation threshold, where a second deviation is different from a first deviation and the second deviation is generally a dramatic change of some parameters of a road caused by an external unexpected situation. The being greater than the preset second deviation threshold may include: a specified threshold is exceed when an obstacle invasion on the road, a dramatic change in a friction coefficient, flooding, an external damage and other unexpected situations cause a sudden change in a safe capability of the road, and the specified threshold is set according to a specific requirement. If yes, step 304 is performed; otherwise, step 305 is performed.

Step 304: Determine that the real-time road information is a fast-changing information, and determine, according to a first determining rule, whether the stored first original road information needs to be corrected.

In this embodiment, after step 304 is performed, steps 306 to 307 are performed.

In this embodiment, the fast-changing information is different from slow-changing information, and the fast-changing information is real-time road information that changes significantly in a short period of time. The fast-changing information may be caused by road construction, a natural disaster, and a traffic accident. Real-time road information continuously collected by m vehicles in a road section is received. If a road condition of a road section rapidly changes, the real-time road information continuously uploaded by the m vehicles in the road section deviates from the stored first original road information.

Step 305: Determine that the real-time road information is slow-changing information, and determine, according to a second determining rule, whether the stored first original road information needs to be corrected.

In this embodiment, after step 305 is performed, steps 310 to 312 are performed.

Step 306: Calculate a standard deviation of the real-time road information of the type uploaded by the m vehicles in the road section.

In this embodiment, the standard deviation of the real-time road information of the type collected by the m vehicles may be calculated to determine whether the real-time road information deviates from the stored first original road information due to a sensor error.

Step 307: Determine whether the standard deviation is less than a preset standard deviation threshold, where the preset standard deviation threshold may be calculated according to an error average value of real-time road information for which a standard deviation needs to be calculated, and a calculation manner is: responsive to a standard deviation of information data corresponding to the m vehicles is less than a specified threshold, the standard deviation is a standard deviation of the information data corresponding to the m vehicles, and the specified threshold is set according to a specific requirement. If yes, step 308 is performed, otherwise, step 309 is performed.

Step 308: Determine that the stored first original road information needs to be corrected.

Step 309: Determine that the stored first original road information does not need to be corrected.

Step 310: Responsive to a time for receiving the real-time road information in the road section reaches a preset time period threshold, the preset time period threshold may be set according to features such as an information volume, vehicle traffic, and an external environment factor of the road section, for example, 24 h, 72 h, or 168 h, or responsive to a data volume of the real-time road information reaches a preset data volume threshold, for example, responsive to the number of cars that collect data reaches a specified threshold, the specified threshold is set according to a specific requirement.

In this embodiment, when the real-time road information is the slow-changing information, sufficient real-time road information is collected in a manner of timing a collection time or specifying the number of pieces of accumulated stored real-time road information.

Step 311: Calculate a deviation between the real-time road information of the type and the original road information.

Step 312: Determine whether the deviation is greater than a preset third deviation threshold, where the third deviation is a deviation between real-time road information and original road information.

In this embodiment, if the deviation is greater than the preset third deviation threshold, step 308 is performed. If the deviation is not greater than the preset third deviation threshold, and a deviation may be caused due to a factor such as a collection device and an environment, step 309 is performed.

Figure 4:
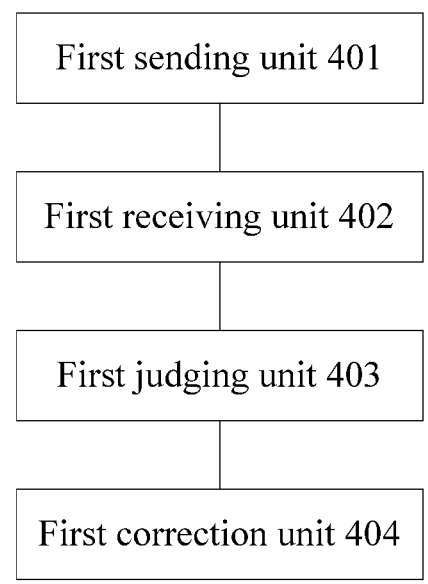
FIG. 4 is a schematic structural diagram of an embodiment of a road information correction apparatus based on V2X according to the present disclosure.

Referring to FIG. 4, FIG. 4 is a schematic structural diagram of a road information correction apparatus based on V2X according to the present disclosure. The road information correction apparatus based on V2X includes a first sending unit 401, a first receiving unit 402, a first judging unit 403, and a first correction unit 404.

The first sending unit 401 is configured to send a road information map to a first vehicle, such that the first vehicle obtains original road information by using the road information map, and collects real-time road information, where the road information map is generated by a cloud server according to stored first original road information.

In this embodiment, the stored first original road information is obtained by receiving first original road information collected by the first vehicle.

The first receiving unit 402 is configured to receive the real-time road information uploaded by the first vehicle.

The first judging unit 403 is configured to determine, according to the real-time road information, whether the stored first original road information needs to be corrected.

The first correction unit 404 is configured to: responsive to the first judging unit 403 determines that correction is required, correct the stored first original road information according to the real-time road information; and responsive to the first judging unit 403 determines that no correction is required, not correct the original road information.

In this embodiment, the first correction unit 404 further includes a correction subunit, and the correction subunit is configured to replace the stored first original road information with the real-time road information.

In this embodiment, the road information correction apparatus based on V2X further includes a second receiving unit, a second calculating unit, a second judging unit, and a second correction unit. The second receiving unit is configured to receive second original road information collected by the second vehicle. The second calculating unit is configured to calculate a deviation between the second original road information and the stored first original road information. The second judging unit is configured to: after the second calculating unit calculates the deviation between the second original road information and the stored first original road information, determine whether the deviation is greater than a preset first deviation threshold. The second correction unit is configured to: responsive to the judging unit determines that the deviation is greater than the preset first deviation threshold, correct the stored first original road information by replacing the stored first original road information with the second original road information; and responsive to the judging unit determines that the deviation is not greater than the preset first deviation threshold, not correct the stored first original road information.

In this embodiment, the road information correction apparatus based on V2X further includes a road information application unit, configured to be used by the first vehicle to apply the original road information, specifically including: controlling an active suspension system of a vehicle in advance according to the original road information of the road ahead, assisting a self-driving vehicle to plan a vehicle trajectory in advance according to the original road information of the road ahead, giving a driver a safety prompt in advance according to the original road information of the road ahead, or reporting a dangerous situation on a road to a road management department according to the original road information of the road ahead.

Figure 5:
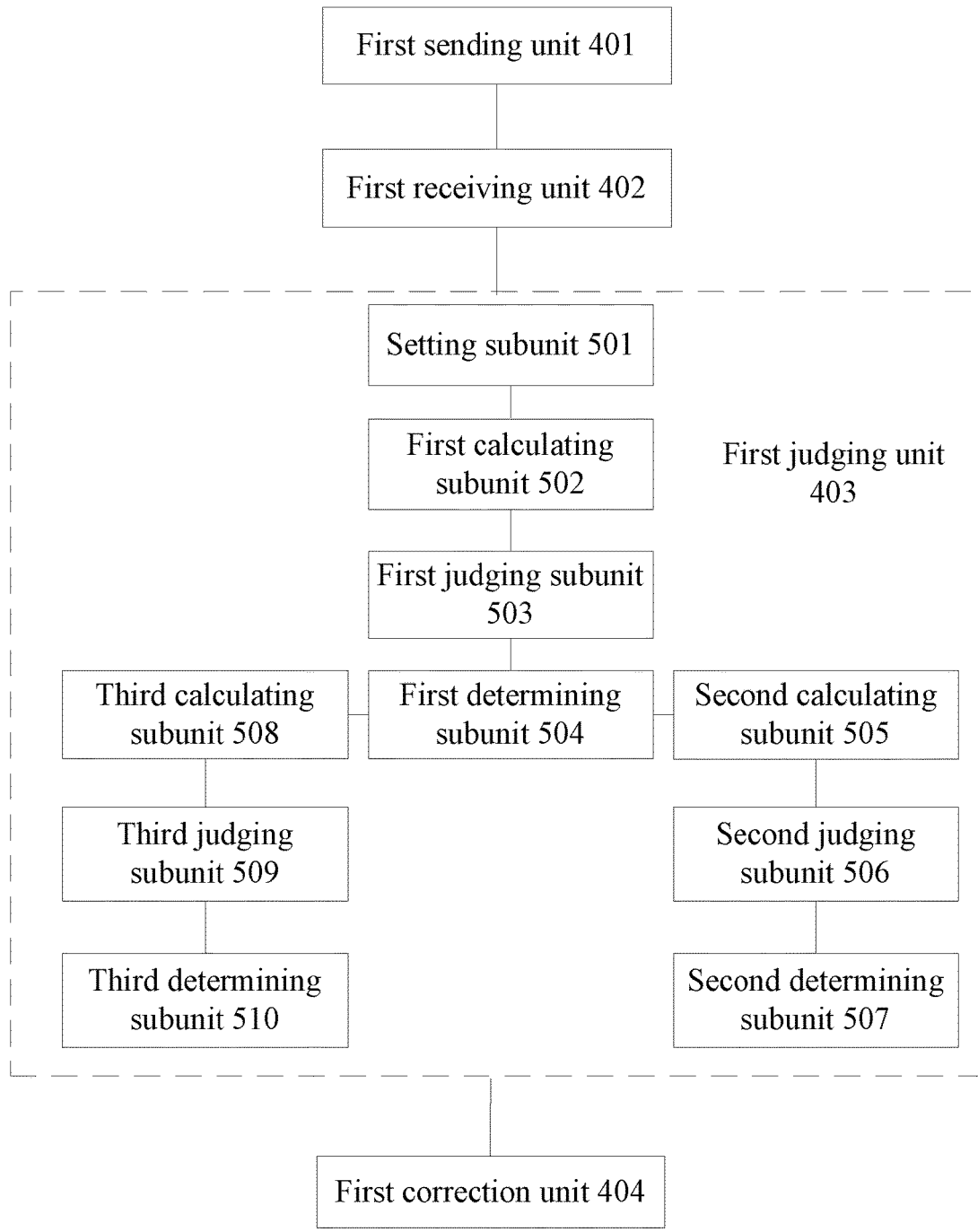
FIG. 5 is a schematic structural diagram of another embodiment of a road information correction apparatus based on V2X according to the present disclosure.

In an example of this embodiment, referring to FIG. 5, FIG. 5 is a schematic structural diagram of another embodiment of a road information correction apparatus based on V2X according to the present disclosure. A difference between FIG. 5 and FIG. 4 lies in that the first judging unit further includes a setting subunit 501, a first calculating subunit 502, a first judging subunit 503, a first determining subunit 504, a second calculating subunit 505, a second judging subunit 506, a second determining subunit 507, a third calculating subunit 508, a third judging subunit 509, and a third determining subunit 510.

In this example, the setting subunit 501 is configured to set the number m of vehicles that continuously upload the real-time road information.

The first calculating subunit 502 is configured to calculate a difference between the real-time road information of a type continuously uploaded by each of the m vehicles in a road section and the stored first original road information of the type.

The first judging subunit 503 is configured to: after the first calculating subunit 502 determines the differences between the real-time road information of the type continuously uploaded by the m vehicles in the road section and the stored first original road information of the type, determine whether the differences are greater than a preset second deviation threshold.

The first determining subunit 504 is configured to: after the first judging subunit 503 determines that the differences are greater than the preset second deviation threshold, determine that the real-time road information is fast-changing information, and determine, according to a first determining rule, whether the stored first original road information needs to be corrected; and after the first judging subunit 503 determines that the differences are less than the preset second deviation threshold, determine that the real-time road information is slow-changing information, and determine, according to a second determining rule, whether the stored first original road information needs to be corrected.

The second calculating subunit 505 is configured to: after the first determining subunit 504 determines that the real-time road information is the fast-changing information, calculate a standard deviation of the real-time road information of the type uploaded by the m vehicles in the road section.

The second judging subunit 506 is configured to: after the second calculating subunit 505 determines the standard deviation of the real-time road information of the type uploaded by the m vehicles in the road section, determine whether the standard deviation is less than a preset standard deviation threshold.

The second determining subunit 507 is configured to: after the second judging subunit 506 determines that the standard deviation is less than the preset standard deviation threshold, determine that the stored first original road information needs to be corrected; and after the second judging subunit 506 determines that the standard deviation is not less than the preset standard deviation threshold, determine that the stored first original road information does not need to be corrected.

The third calculating subunit 508 is configured to: after the first determining subunit 504 determines that the real-time road information is the slow-changing information, responsive to a time for receiving the real-time road information in the road section reaches a preset time period threshold, or responsive to a data volume of the real-time road information reaches a preset data volume threshold, calculate a deviation between the real-time road information of the type and the stored first original road information.

The third judging subunit 509 is configured to: after the third calculating subunit 508 determines the deviation between the real-time road information and the stored first original road information, determine whether the deviation is greater than a preset third deviation threshold.

The third determining subunit 510 is configured to: after the third judging subunit 509 determines that the deviation is greater than the preset third deviation threshold, determine that the stored first original road information needs to be corrected; and after the third judging subunit 509 determines that the deviation is not greater than the preset third deviation threshold, determine that the stored first original road information does not need to be corrected.

In this embodiment, the second determining subunit 507 and the third determining subunit 510 are connected to the first correction unit 404, to transmit a determining result to the first correction unit 404, such that the first correction unit 404 corrects the stored first original road information according to the real-time road information after receiving the stored first original road information that needs to be corrected; and does not correct the original road information after receiving the stored first original road information that does not need to be corrected.

Figure 6:
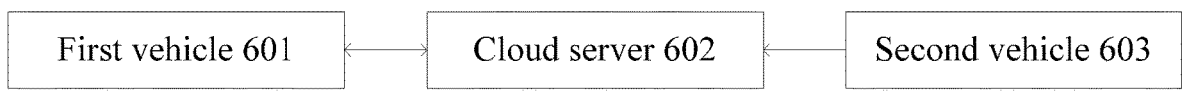
FIG. 6 is a schematic structural diagram of an embodiment of a road information correction system based on V2X according to the present disclosure

Referring to FIG. 6, FIG. 6 is a schematic structural diagram of a road information correction system based on V2X according to the present disclosure. The road information correction system based on V2X includes a first vehicle 601, a cloud server 602, and a second vehicle 603.

In this embodiment, the first vehicle 601 is configured to receive a road information map sent by the cloud server 602; obtain first original road information by using the road information map, and apply the first original road information; and during driving in a road section covered by the road information map, collect real-time road information of the corresponding road section and send the real-time road information to the cloud server 602, such that the cloud server 602 corrects the stored first original road information according to the real-time road information.

The road information correction apparatus 401-404 based on V2X is provided on the cloud server 602 and is configured to store first original road information collected by the second vehicle 603; generate the road information map according to the stored first original road information; send the road information map to the first vehicle 601, and receive the real-time road information collected by the first vehicle 601; determine, according to the real-time road information, whether the stored first original road information needs to be corrected; and correct the stored first original road information according to the real-time road information.

The second vehicle 603 is configured to collect first original road information and send the first original road information to the cloud server 602, such that the cloud server 602 generates the road information map according to the first original road information; and collect second original road information, such that the cloud server 602 corrects the stored first original road information according to the second original road information.

It can be learned from the foregoing that, according to the road information correction method based on, apparatus, and system based on V2X provided in the present disclosure, through a negative feedback mechanism for constant correction on received real-time road information, a first vehicle continuously re-collects real-time road information by using a road information map, to correct stored first original road information, so as to ensure that the first original road information is always updated in synchronization with an actual road situation. After more and more vehicles collect real-time road information at different locations of a road, precision of the first original road information is continuously updated and iteratively. In addition, it is ensured, by using a preset original road information data volume threshold, that there is enough first original road information before the road information map is generated. After generating the road information map, a second vehicle periodically collects second original road information of each road section as a map collection vehicle, to ensure precision of the road information map. Cloud sharing of the first original road information enables the vehicle to obtain the first original road information by downloading the road information map from the cloud in a vehicle coordinated manner when passing through a destination road section. Perception information of the vehicle is merely used for auxiliary confirmation, to greatly reduce dependence of the vehicle on real-time perception, thereby reducing a requirement of the vehicle on a precision of a sensor and a requirement on the number of installation, and reducing a requirement on real-time processing of collected data. In this way, costs of collecting road information by the vehicle are greatly reduced. When abnormal subsidence, damage, displacement, and obstruction occur on a road, real-time road information uploaded by a vehicle traveling on the road section is received, and first original road information of a cloud server can be corrected in a timely manner by using a fast-changing information identification mechanism, to ensure fast sharing of information about a road condition change. In addition, a road manager can also implement global real-time monitoring on road use by using data uploaded by the vehicle, to implement intelligent road operation and maintenance.

In the foregoing specific embodiments, the objectives, technical solutions, and beneficial effects of the present disclosure are further described in detail. It should be understood that the foregoing descriptions are merely specific embodiments of the present disclosure, but are not intended to limit the protection scope of the present disclosure. It should be specially noted that for a person skilled in the art, any modification, equivalent replacement, or improvement made without departing from the spirit and principle of the present disclosure shall fall within the protection scope of the present disclosure.

The invention claimed is:

1. A road information correction and application method based on vehicle-to-everything (V2X), comprising:
    sending a road information map to a first vehicle by a cloud server, obtaining first original road information by the first vehicle by using the road information map, and collecting real-time road information by the first vehicle, wherein the road information map is generated by the cloud server according to stored first original road information, wherein the first original road information comprises: road edge information, road obstacle information, road altitude information, road GPS coordinate information, road visibility information, lane information, road roughness information, and a road surface friction coefficient;
    applying, by the first vehicle, the first original road information, wherein the applying comprises: controlling an active suspension system of the first vehicle in advance according to the first original road information of a road ahead, wherein the controlling the active suspension system of the first vehicle comprises controlling parameters of a real-time position, stiffness, height, stroke, and damping of the suspension;
    receiving the real-time road information uploaded by the first vehicle; and by a processor,
    determining, according to the real-time road information, whether the stored first original road information needs to be corrected;
    in response to determining that the stored first original road information needs to be corrected, correcting the stored first original road information according to the real-time road information; and
    in response to determining that the stored first original road information does not need to be corrected, not correcting the stored first original road information,
    wherein the determining, according to the real-time road information, whether the stored first original road information needs to be corrected comprises:
    setting a number m of vehicles that continuously upload the real-time road information;
    calculating a difference between the real-time road information of a type continuously uploaded by each of the m vehicles in a road section and the stored first original road information of the type;
    determining whether the differences are greater than a preset second deviation threshold;
    in response to determining that the differences are greater than the preset second deviation threshold, determining that the real-time road information is fast-changing information, and determining, according to a first determining rule, whether the stored first original road information needs to be corrected; and
    in response to determining that the differences are not greater than the preset second deviation threshold, determining that the real-time road information is slow-changing information, and determining, according to a second determining rule, whether the stored first original road information needs to be corrected,
    wherein the determining, according to the first determining rule, whether the stored first original road information needs to be corrected comprises:

calculating a standard deviation of the real-time road information of the type uploaded by the m vehicles in the road section;

determining whether the standard deviation is less than a preset standard deviation threshold;

in response to determining that the standard deviation is less than the preset standard deviation threshold, determining that the stored first original road information needs to be corrected; and in response to determining that the standard deviation is not less than the preset standard deviation threshold, determining that the stored first original road information does not need to be corrected, wherein the determining, according to the second determining rule, whether the stored first original road information needs to be corrected comprises:

responsive to a time for receiving the real-time road information in the road section reaching a preset time period threshold, or responsive to a data volume of the real-time road information reaching a preset data volume threshold, calculating a deviation between the real-time road information of the type and the stored first original road information of the type;

determining whether the deviation is greater than a preset third deviation threshold;

in response to determining that the deviation is greater than the preset third deviation threshold, determining that the stored first original road information needs to be corrected; and in response to determining that the deviation is not greater than the preset third deviation threshold, determining that the stored first original road information does not need to be corrected, wherein the type of the real-time road information comprises one or a combination of road edge information, lane edge information, road obstacle information, road roughness information, road visibility information, road altitude information, road global positioning system (GPS) coordinate information, and a road surface friction coefficient.

2. The road information correction and application method based on V2X according to claim 1, wherein the stored first original road information is obtained by receiving the first original road information collected by a second vehicle.

3. The road information correction and application method based on V2X according to claim 2, wherein after the receiving the first original road information collected by the second vehicle, the method comprises:

receiving second original road information collected by the second vehicle;

calculating a deviation between the second original road information and the stored first original road information by the processor;

determining whether the deviation is greater than a first deviation threshold by the processor;

in response to determining that the deviation is greater than the first deviation threshold, correcting the stored first original road information by replacing the stored first original road information with the second original road information by the processor; and in response to determining that the deviation is not greater than the first deviation threshold, not correcting the stored first original road information by the processor.

4. The road information correction and application method based on V2X according to claim 1, wherein the correcting the stored first original road information according to the real-time road information is replacing the stored first original road information with the real-time road information.

* * * * *